May 12, 1936.  G. BINIEK  2,040,683
ELECTRIC SAFETY RAZOR
Filed Aug. 31, 1933
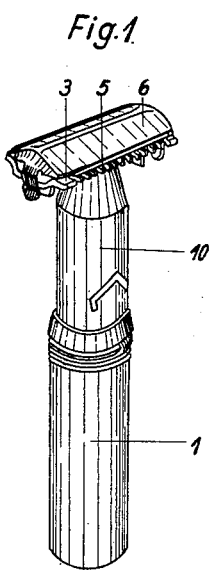
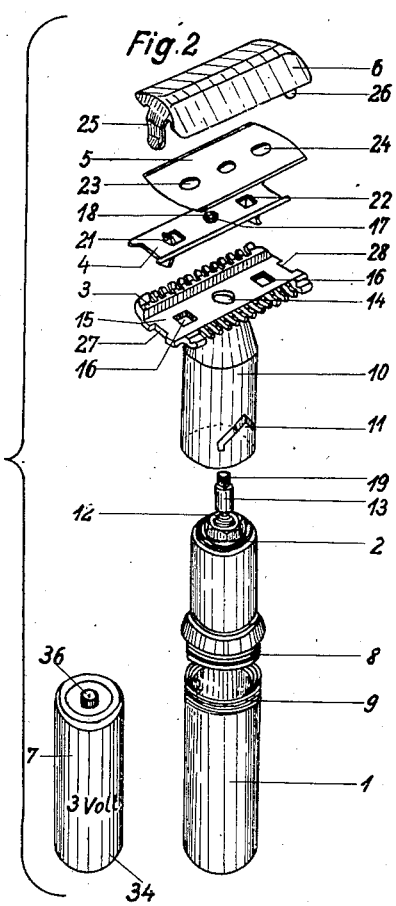
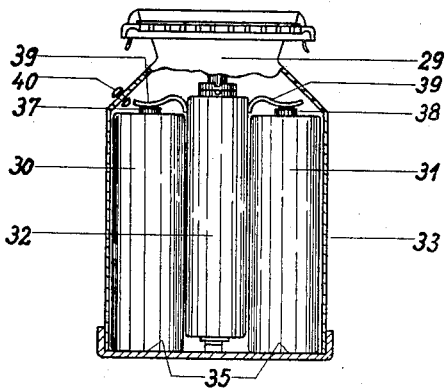
Inventor Patented May 12, 1936

2,040,683

UNITED STATES PATENT OFFICE 2,040,683

ELECTRIC SAFETY RAZOR

Georg Biniek, Berlin-Charlottenburg, Germany, assignor to Telephon-Apparat-Fabrik E. Zwietusch & Co. G. m. b. H., Berlin-Charlottenburg, Germany Application August 31, 1933, Serial No. 687,680
In Germany March 6, 1933

5 Claims. (Cl. 30—45)

Electric safety razors are known the driving motor of which is actuated by low voltage current batteries. In these razors the battery is accommodated in a casing separate from the safety razor, for which reason a cable for supplying current connects the battery with the motor.

According to the invention the handle of the electric razor accommodates both the electric drive for producing the movement of the blade and also the battery. The source of current consists of one or more torch batteries or the like, such as are usually employed for pocket lamps, which batteries are arranged in the handle in the longitudinal direction of the motor axle or on one or both sides of the motor. The machine is rendered very handy by the arrangement according to the invention. The elimination of the lead cable reduces the drop in potential to a minimum; moreover any possible electrical or mechanical impediment is avoided, such as might be caused by the cable when using the known safety razors. The construction of the razor is such that all parts which are exchangeable or require to be cleaned repeatedly are easily removable.

Two embodiments of the invention are illustrated by way of example in the accompanying drawing in which:—

Fig. 1 shows the safety razor in perspective view.

Fig. 2 shows the razor according to Fig. 1 with the individual parts dismantled.

Fig. 3 is a part longitudinal section of a modified form of construction.

The safety razor is substantially composed of the parts shown in Fig. 2, namely a battery holder 1, casing 2 for the motor, guard plate head 3, blade carrier 4, blade 5 and cover plate 6. The battery holder 1 and the sleeve 10 of the guard plate head 3 form the handle of the safety razor (Fig. 1). For facilitating the exchanging of the battery 7, the casing 2 of the motor and the battery holder 1 are provided with screw threads 8 and 9 respectively. To enable the guard plate head, the blade and the like to be thoroughly cleaned with water after use without it being necessary to consider the electric parts, i. e. the motor and battery, the guard plate head 3 is constructed so that it can be pulled off the electric part of the safety razor by one single manipulation. For this purpose the guard plate head 3 is united with the sleeve 10 which is slipped over the casing 2 of the motor and fits tightly thereon. To afford a firmer hold a spring 11 is milled out of the wall of the sleeve 10, the free end of this spring being bent slightly inwards. In this manner it is possible to ensure a more or less tight fit between the sleeve 10 and the casing 2 of the motor. When the parts 2 and 3 and 10 have been properly fitted together, a triangular cam 13 with outwardly curved sides fixed on the motor shaft 12 projects slightly from an aperture 14 in the guard plate head 3. This head has a longitudinal milled out portion 15 constituting a guideway for accommodating the blade carrier 4 and two rectangular recesses 16 one at each end. When the blade carrier 4 has been placed in the milled out portion 15, the triangular cam 13 extends through a sleeve 17 having two parallel opposite faces 18 and mounted in the middle of the carrier 4. The triangular cam 13 rotated by the motor through the intermediary of the shaft 12 imparts a reciprocating movement to the carrier 4 owing to the curved faces 19 of the triangular cam 13 rolling on the two parallel opposite faces 18 of the sleeve 17. The blade 5 placed on the carrier 4 is held by two spreading resilient catches 21, 22 which engage in holes 16 in the guard plate head 3 through holes 23, 24 in the blade 5. The roof shaped cover plate 6 is placed over the blade and has two resilient flaps 25 and 26 which engage in the recesses 27 and 28 in the guard plate head 3 so that the cap 6 is detachably connected to the head 3. There is sufficient clearance between the parts 6 and 3 to allow the blade 5 and the blade carrier 4 to move freely backwards and forwards. On the bottom of the battery holder 1 a switch, not shown in the drawing is provided by means of which current from the battery 1 to the motor can be switched on and off.

Fig. 3 shows a modified form of construction of an electric safety razor 29, in which, for example two torch batteries 30, 31 are accommodated one on each side of the motor 32 and insulated except at the bottoms. The torch batteries are arranged symmetrical to the motor. If importance is attached to the smallest possible dimensions, the casing 33 may be constructed so that only one torch battery, for example the battery 30, is arranged at the side of the motor 32. One pole 34, 35 of the battery is connected with the motor 2 or 32 by the handle 1, 2 or 33, whereas the second pole 36, 37, 38 of the battery is connected to the motor 2, 32 by means of a contact spring 39, not shown in Fig. 2. The above mentioned switch is arranged in the case of the arrangement of the torch on the bottom of the battery holder, whereas in the case of the handle as shown in Fig. 3 a switch 40, for example, is preferably arranged on the side of the handle.

I claim:—

1. In an electric safety razor, the combination of a hollow handle, a reciprocable blade mounted on said handle, a motor for imparting reciprocating movements to said blade, and an electric power source for actuating said motor, said handle consisting of substantially two sections detachably connected with each other, one of said sections containing said motor and the other section containing said electric power source.

2. In an electric safety razor, the combination of a hollow handle, a reciprocable blade mounted on said handle, a motor for imparting reciprocating movements to said blade, and an electric power source for actuating said motor, said handle consisting of substantially two sections provided with co-operating screwthreaded portions whereby said sections are detachably connected with each other, one of said sections containing said motor and the other section containing said electric power source.

3. In an electric safety razor, the combination of a guard plate head provided with a guideway, a blade reciprocable lengthwise of said guideway, a motor for imparting reciprocating movements to said blade, a tubular casing independent of said motor and surrounding the same, and a sleeve carrying said guard plate head adapted to be slipped over said casing for removably attaching the guard plate head thereto.

4. In an electric safety razor, the combination of a casing, a guard plate head provided with a guideway, a blade reciprocable lengthwise of said guideway, a motor located in said casing for imparting reciprocating movements to said blade, a sleeve carrying said guard plate head adapted to be slipped over said casing for attaching the guard plate head thereto, and a spring formed in said sleeve and arranged to bear against said casing for securely holding said sleeve thereon.

5. In an electric safety razor, the combination of a blade carrier head, a blade reciprocable in said carrier head, a motor for imparting reciprocating movements to said blade, a tubular casing independent of said motor and surrounding the same, an electric power source for actuating said motor mounted within said casing, and a sleeve carrying said blade carrier head adapted to be slipped over said casing for removably attaching the blade carrier head thereto.

GEORG BINIEK.